US012609380B2

(12) United States Patent
Baek et al.

(10) Patent No.: US 12,609,380 B2
(45) Date of Patent: Apr. 21, 2026

(54) BATTERY MODULE

(71) Applicant: SK On Co., Ltd., Seoul (KR)

(72) Inventors: Moo Han Baek, Daejeon (KR); Dae Won Kwon, Daejeon (KR); Yong Uk Kim, Daejeon (KR); Byung Jun Park, Daejeon (KR); Jong Ho Seok, Daejeon (KR)

(73) Assignee: SK On Co., Ltd., Seoul (KR)

( * ) Notice: Subject to any disclaimer, the term of this patent is extended or adjusted under 35 U.S.C. 154(b) by 6 days.

(21) Appl. No.: 17/731,678

(22) Filed: Apr. 28, 2022

(65) Prior Publication Data

US 2022/0384877 A1 Dec. 1, 2022

(30) Foreign Application Priority Data

May 28, 2021 (KR) ........................ 10-2021-0068702

(51) Int. Cl.
H01M 10/659 (2014.01)
H01M 10/613 (2014.01)
H01M 10/647 (2014.01)

(52) U.S. Cl.
CPC ....... H01M 10/659 (2015.04); H01M 10/613 (2015.04); H01M 10/647 (2015.04)

(58) Field of Classification Search
CPC ............. H01M 10/659; H01M 10/613; H01M 10/647; H01M 10/658; H01M 50/291; H01M 50/293; H01M 50/211
See application file for complete search history.

(56) References Cited

U.S. PATENT DOCUMENTS

| | | | |
|---|---|---|---|
| 11,063,316 B2 | 7/2021 | Kim et al. | |
| 2009/0061299 A1 | 3/2009 | Uchida et al. | |
| 2010/0028758 A1* | 2/2010 | Eaves ............... | H01M 10/6555 |
| | | | 429/50 |
| 2013/0202939 A1 | 8/2013 | Kwak et al. | |
| 2013/0252063 A1* | 9/2013 | Park .................... | H01M 50/209 |
| | | | 429/120 |
| 2017/0271726 A1* | 9/2017 | Shen ................... | H01M 10/653 |
| 2018/0034121 A1* | 2/2018 | Kwon ................. | H01M 10/627 |

(Continued)

FOREIGN PATENT DOCUMENTS

| | | |
|---|---|---|
| CN | 104183863 A | 12/2014 |
| CN | 107093695 A | 8/2017 |

(Continued)

OTHER PUBLICATIONS

Cheuk Ying Cahn et al., Recent advances of hydrogel electrolytes in flexible energy storage devices, Journal of Materials Chemistry A, 2021, pp. 2043-2069, vol. 9, Royal Society of Chemistry.

(Continued)

*Primary Examiner* — Miriam Stagg
*Assistant Examiner* — Lilia Nedialkova
(74) *Attorney, Agent, or Firm* — IP & T GROUP LLP

(57) ABSTRACT

A battery module comprises a battery sub-module including one or more battery cells, and a barrier disposed to face one side surface of the battery sub-module, in which the barrier includes a rigid member supporting the battery sub-module, and a heat absorbing member accommodated in the rigid member to absorb heat generated by the one or more battery cells.

16 Claims, 9 Drawing Sheets

(56) References Cited

U.S. PATENT DOCUMENTS

| | | | |
|---|---|---|---|
| 2018/0145294 A1 | 5/2018 | Choi et al. | |
| 2019/0181405 A1 | 6/2019 | Kim et al. | |
| 2019/0386359 A1* | 12/2019 | Lokhorst | C09K 5/06 |
| 2020/0067156 A1* | 2/2020 | Chi | H01M 10/625 |
| 2022/0115737 A1 | 4/2022 | Shin et al. | |
| 2022/0373268 A1* | 11/2022 | Al-Hallaj | H01M 10/659 |

FOREIGN PATENT DOCUMENTS

| | | |
|---|---|---|
| EP | 2031672 B1 | 4/2014 |
| JP | 2009-054403 A | 3/2009 |
| KR | 10-2013-0091510 A | 8/2013 |
| KR | 10-2019-0049682 A | 5/2019 |
| KR | 10-2019-0069873 A | 6/2019 |
| KR | 10-2021-0004189 A | 1/2021 |
| KR | 10-2021-0006182 A | 1/2021 |
| WO | 2017/219135 A1 | 12/2017 |

OTHER PUBLICATIONS

Extended European Search Report for the European Patent Application No. 22172156.6 issued by the European Patent Office on Oct. 21, 2022.
Office Action for Korean Patent Application No. 10-2021-0068702 issued by the Korean Patent Office on May 14, 2025.

* cited by examiner

BATTERY MODULE

CROSS-REFERENCE TO RELATED APPLICATION(S)

This application claims benefit of priority to Korean Patent Application No. 10-2021-0068702 filed on May 28, 2021 in the Korean Intellectual Property Office, the disclosure of which is incorporated herein by reference in its entirety.

BACKGROUND

1. Field

The present disclosure relates to a battery module, and more particularly, to a battery module including a barrier that may be disposed between battery sub-modules including a battery cell to prevent heat or flames generated by the battery cell from being transferred to other portions of the battery module and to stably support the battery sub-modules.

2. Description of Related Art

As technological development and demand for a mobile device, an electric vehicle, an energy storage system (ESS), and the like increase, the demand for secondary battery cells as an energy source is rapidly increasing. A secondary battery cell is a battery that may be repeatedly charged and discharged because mutual conversion between chemical energy and electrical energy is reversible.

The secondary battery cell includes an electrode assembly such as a cathode, an anode, a separator, and an electrolyte, which are main components of a secondary battery, and a cell body member of a laminated film case that protects the electrode assembly.

The electrode assembly of the secondary battery cell generates heat while charging and discharging. An internal temperature of the secondary battery cell may increase due to such heat generation, thereby deteriorating the electrical performance of the secondary battery cell. In addition, when such heat generation is severe, an internal pressure of the secondary battery cell increases, thereby causing ignition of the secondary battery cell. Furthermore, when a plurality of secondary battery cells are mounted in a battery pack or an energy storage system (ESS), the flames generated by the ignition of any one of the secondary battery cells is transferred to other secondary battery cells nearby, resulting in a chain ignition or explosion.

In addition, there is a problem in that the flames generated by the secondary battery cell is transferred to the battery pack or other components (e.g., support structure of the energy storage system) of the energy storage system, thereby collapsing the entire structure of the energy storage system.

SUMMARY

An aspect of the present disclosure may provide a battery module including a barrier capable of preventing heat or flames generated in any one of battery sub-modules including a battery cell from being transferred to other adjacent battery sub-modules.

Another aspect of the present disclosure may provide a battery module that has a heat absorbing member provided on at least a portion of an inside or outside of a barrier to effectively control heat or flames generated by a battery cell.

Still another aspect of the present disclosure may provide a battery module that has a heat absorbing member capable of cooling a barrier provided on at least a portion of an inside or outside of the barrier to prevent the barrier from collapsing by flames generated by battery sub-modules adjacent to the barrier.

Yet another aspect of the present disclosure may provide a battery module having a protruding portion provided on at least a portion of a barrier to press and stably support adjacent battery sub-modules.

According to an aspect of the present disclosure, a battery module may include a battery sub-module including one or more battery cells; and a barrier disposed to face one side surface of the battery sub-module, in which the barrier includes a rigid member supporting the battery sub-module, and a heat absorbing member accommodated in the rigid member to absorb heat generated by the one or more battery cells.

The heat absorbing member may include a hydrogel.

The hydrogel included in the heat absorbing member may include at least one of a super absorbent polymer or polyacrylamide. That is, the hydrogel may include one or more of the following materials: a super absorbent polymer and polyacrylamide.

The rigid member may include a base opposing the one side surface of the battery sub-module, and a protruding portion pressing at least a portion of the battery sub-module in an inward direction of the battery sub-module from an edge of the base, and an air gap may be formed between the base and the battery sub-module.

The rigid member may include a first plate and a second plate coupled to oppose each other, and the heat absorbing member may be accommodated between the first plate and the second plate.

The first plate and the second plate may be coupled to each other to surround an outside of the heat absorbing member.

At least one of the first plate or the second plate may include an accommodating portion in which the heat absorbing member is accommodated, and the first plate and the second plate may be coupled to each other to separate the heat absorbing member accommodated in the accommodating portion from an outside of the rigid member.

The accommodating portion may include a first accommodating portion and a second accommodating portion extending side by side in the same direction, and a partition wall may be provided between the first accommodating portion and the second accommodating part.

A heat absorbing member may be accommodated in the first accommodating portion and the second accommodating portion, respectively, and at least one of the heat absorbing members accommodated in the first accommodating portion and the second accommodating portion may be provided to have an area corresponding to any one of the battery cells included in the battery sub-module.

The accommodating portion may further include a connection portion connecting the first accommodating portion and the second accommodating portion through the partition wall, and the heat absorbing member may be integrally accommodated over the first accommodating portion, the second accommodating portion, and the connection part.

The first plate may include a fastening protrusion protruding toward the second plate, and the second plate may include a fastening groove into which the fastening protrusion is inserted.

The heat absorbing member may be accommodated on a side surface of the rigid member and may be configured to face the battery sub-module.

The side surface of the rigid member may include an accommodating groove in which the heat absorbing member is accommodated.

The accommodating groove may include a first accommodating portion and a second accommodating portion extending side by side in the same direction, and at least one of the first accommodating groove or the second accommodating groove may be configured to have an area corresponding to any one of the battery cells included in the battery sub-module.

The accommodating groove may further include a connection groove connecting the first accommodating groove and the second accommodating groove, and the heat absorbing member may be integrally accommodated over the first accommodating groove, the second accommodating groove, and the connection groove.

The barrier may be disposed between a plurality of battery sub-modules adjacent to each other, and the heat absorbing members may be accommodated on both side surfaces of the rigid member and are configured to face each of the plurality of battery sub-modules.

The battery module may further include a sub-barrier disposed to oppose the other side surface opposite to the one side surface of the battery sub-module and having a width smaller than that of the barrier.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
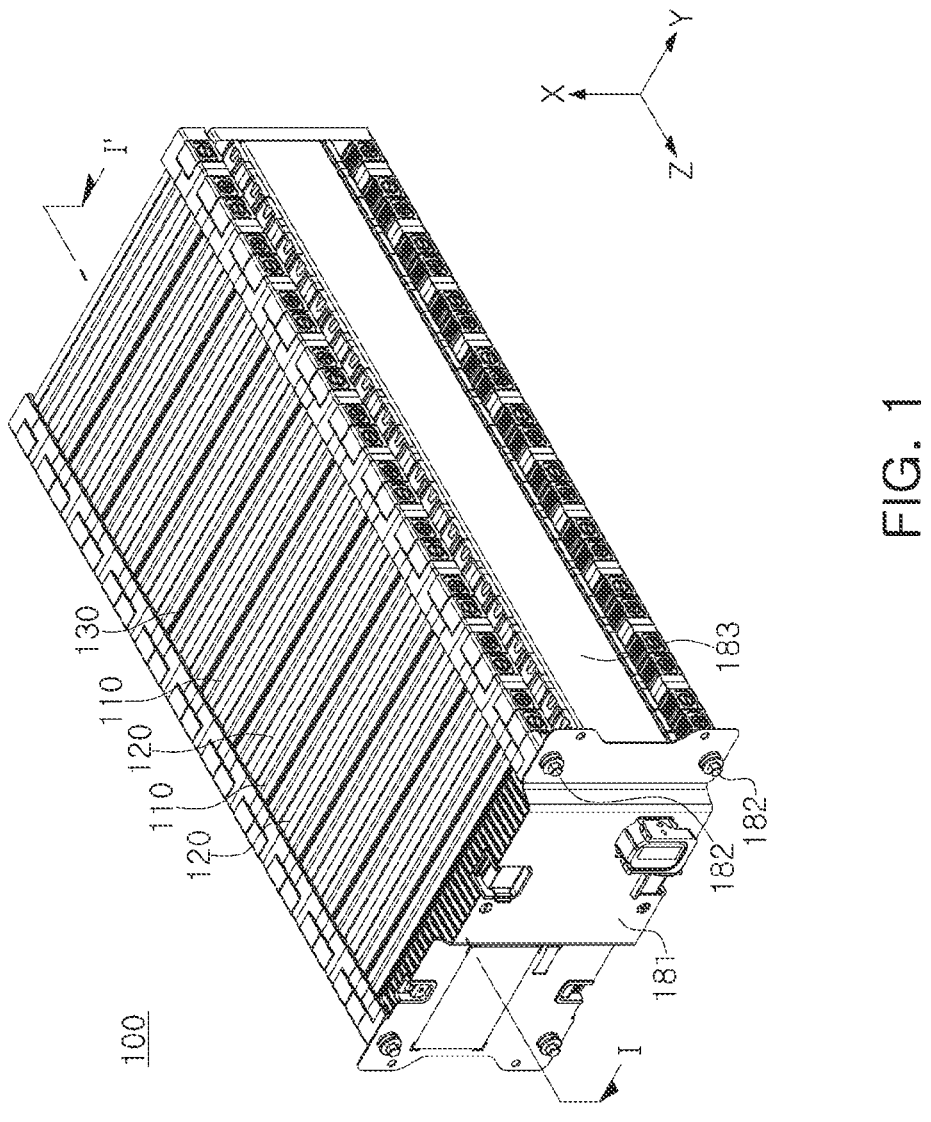
FIG. 1 is a perspective view of a battery module according to exemplary embodiments.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the invention. Therefore, the configurations described in the exemplary embodiments and drawings of the present disclosure are merely most preferable exemplary embodiments but do not represent all of the technical spirit of the present disclosure. Thus, the present disclosure should be construed as including all the changes, equivalents, and substitutions included in the spirit and scope of the present disclosure at the time of filing this application.

Hereinafter, exemplary embodiments in the present disclosure will be described with reference to the accompanying drawings. However, the exemplary embodiments in the present disclosure may be modified into many different forms and the scope of the present disclosure is limited to exemplary embodiments set forth herein. Rather, these exemplary embodiments are provided so that the present disclosure will completely describe the present disclosure to those skilled in the art. In the drawings, shapes, sizes, and the like, of components may be exaggerated for clarity.

In addition, in the present specification, a singular expression includes a plural expression unless the context clearly dictates otherwise, and the same reference numerals refer to the same or corresponding components throughout the specification.

In addition, in the present specification, terms "upper side," "upper portion," "lower side," "lower portion," "side surface," "front surface," "rear surface," and the like, are represented based on the drawings and may be differently represented when directions of corresponding targets are changed.

Figure 2:
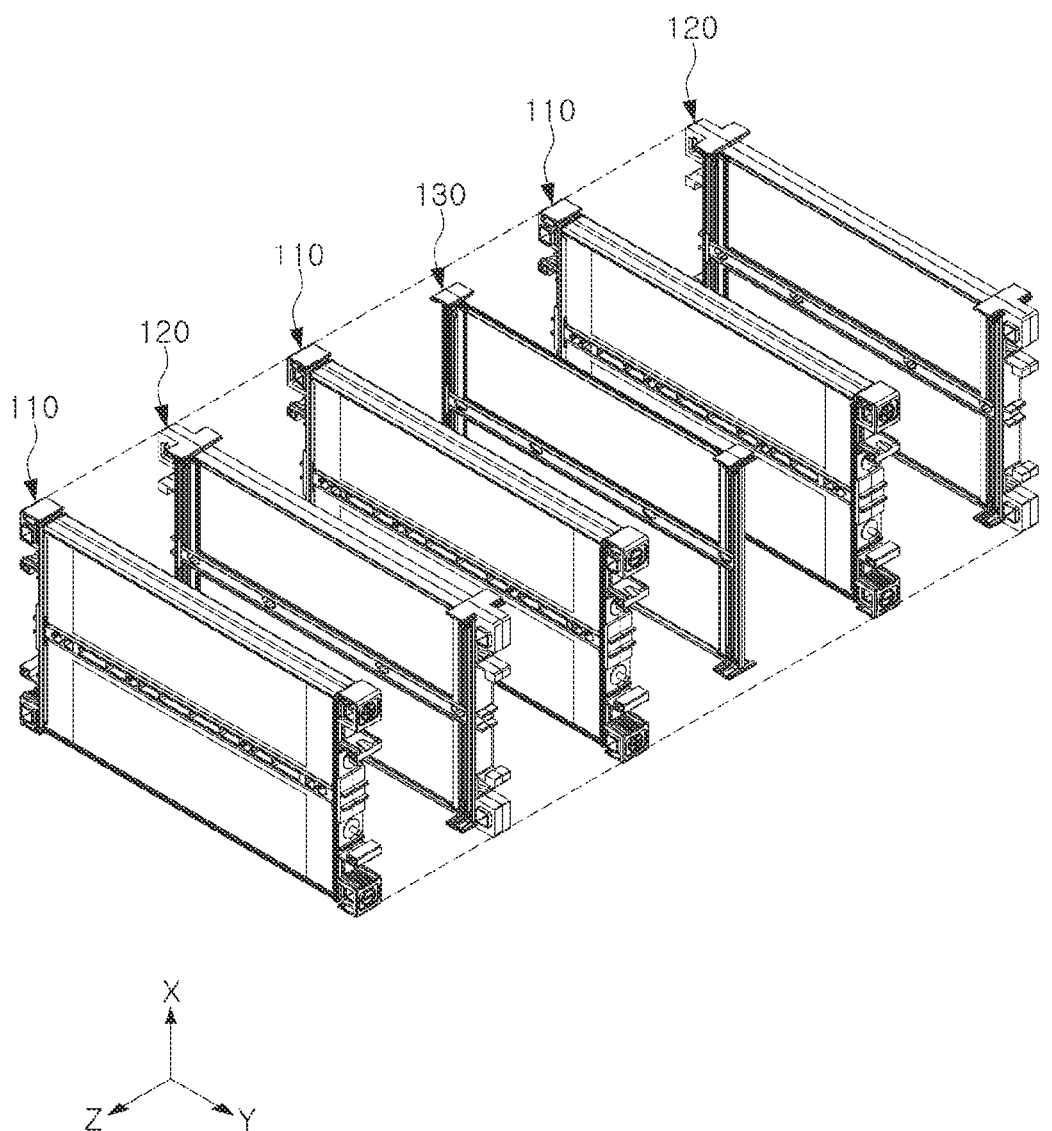
FIG. 2 is a partially exploded perspective view of the battery module according to exemplary embodiments.

FIG. 1 is a perspective view of a battery module 100 according to exemplary embodiments, and FIG. 2 is a partially exploded perspective view of the battery module (100 in FIG. 1) according to exemplary embodiments.

In exemplary embodiments, the battery module 100 may include a plurality of battery sub-modules 110 stacked in one direction (e.g., Z-axis direction). Each battery sub-module 110 includes one or more battery cells (e.g., 112 in FIG. 3), and accordingly, the battery sub-module 110 may use the battery cells (112 in FIG. 3) to charge or discharge electrical energy.

The battery module 100 may include structures that bind the plurality of battery sub-modules 110 into one pack. For example, as illustrated in FIG. 1, the battery module 100 may include an end plate 181 binding a plurality of battery sub-modules 110 stacked and arranged in one direction into one pack.

In exemplary embodiments, the end plate 181 may be disposed opposite to both end portions of the battery module 100, and the end plates 181 and the battery sub-modules 110 may be fixed to each other by a connecting member 182 penetrating therethrough. The connecting member 182 presses the end plates 181 disposed opposite to each other in a direction to approach each other, so the battery sub-modules 110 may be in a state of being pressed in a stacking direction (Z-axis direction) with respect to each other. For example, the end plates 181 may be respectively fitted to both ends of the bar-shaped connecting member 182 extending in the stacking direction (Z-axis direction), and a nut may be coupled thereon. The end plate 181 and the connecting member 182 press both side surfaces of the battery cell (112 in FIG. 3) to stably support the battery cell (112 in FIG. 3). In exemplary embodiments, the battery module 100 may further include a side wall cover member 183 surrounding side portions of the plurality of battery sub-modules 110.

In exemplary embodiments, the battery module 100 may include one or more barriers 120 disposed between the battery sub-modules 110. The barrier 120 is formed of a rigid member (e.g., 121 in FIG. 4) in which a heat absorbing member (e.g., 124 in FIGS. 5, 6 and 8) capable of absorbing heat energy is accommodated, and thus, it is possible to physically support the battery sub-module 110 and at the same time, to serve to a barrier.

Figure 5:
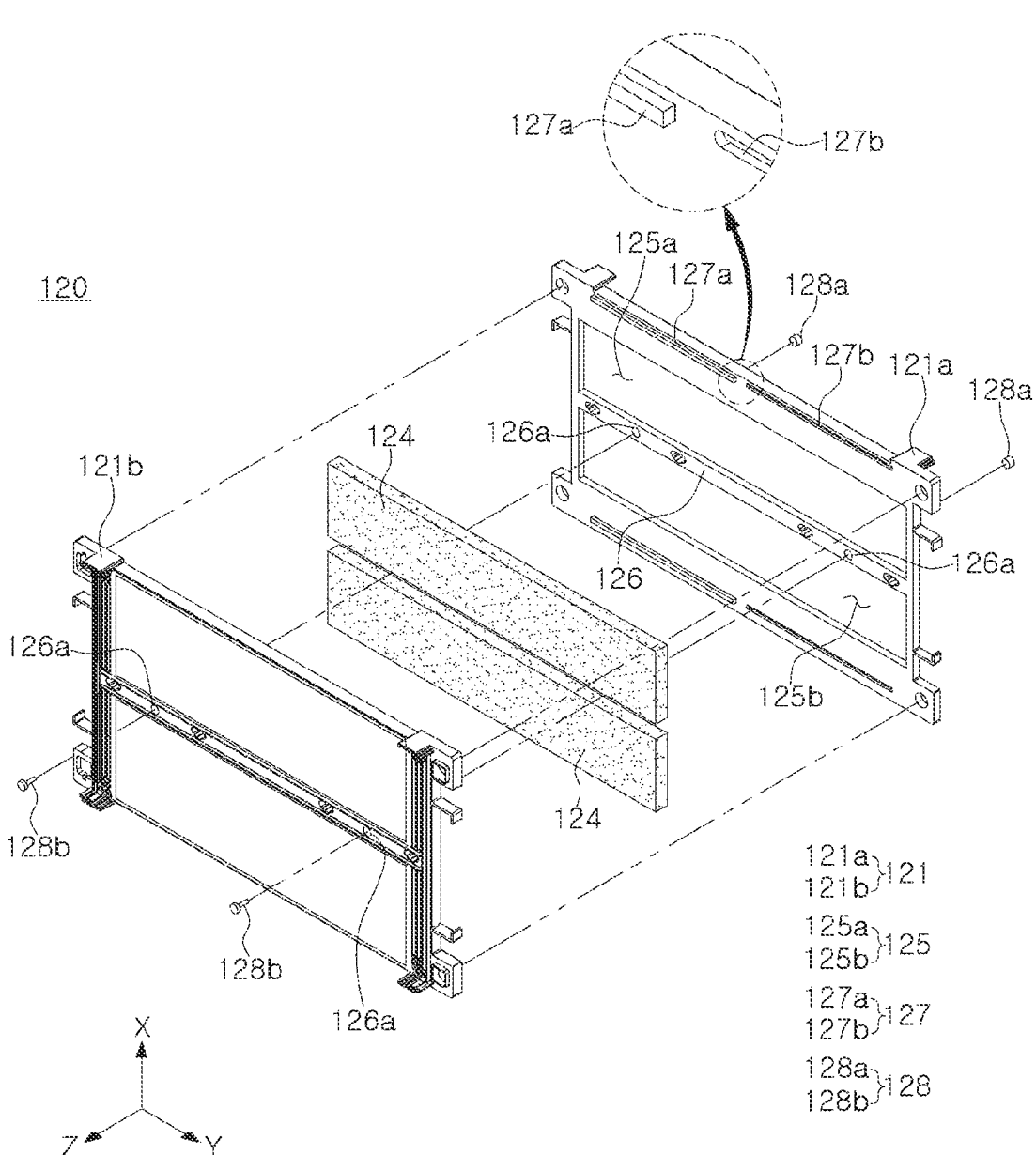
FIG. 5 is an exploded perspective view of the barrier according to the exemplary embodiments.
Figure 6:
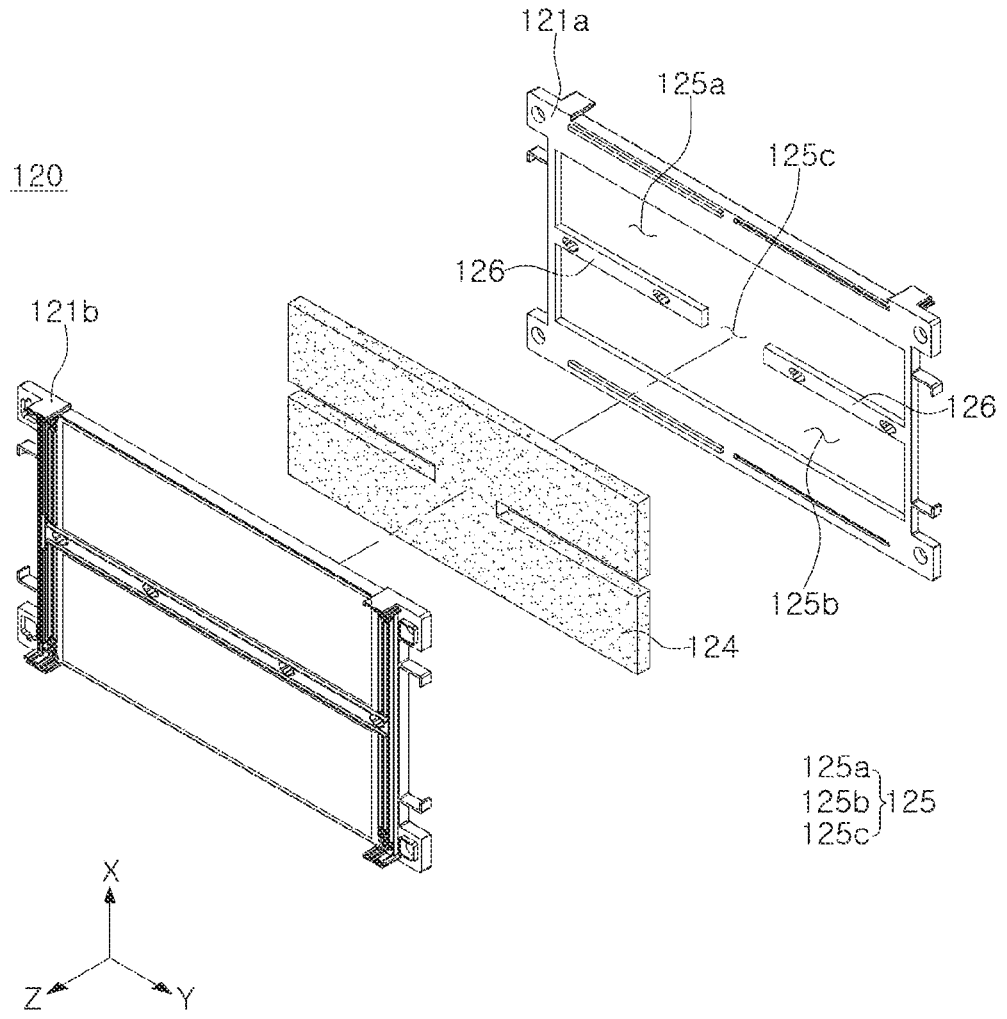
FIG. 6 is an exploded perspective view of a barrier according to other exemplary embodiments.
Figure 8:
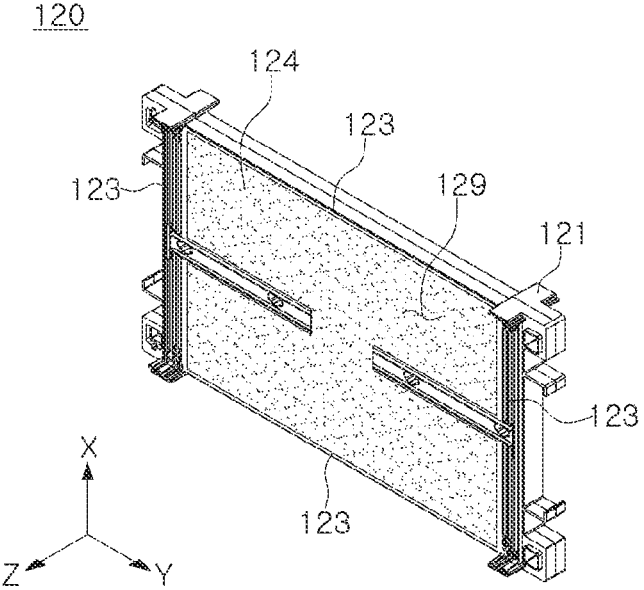
FIG. 8 is a perspective view of a barrier according to other exemplary embodiments.

Meanwhile, the battery module 100 according to the exemplary embodiments may further include a barrier 130 that is not provided with a heat absorbing member (124 in FIGS. 5, 6, and 8). That is, the battery module 100 may include a barrier 120 including a heat absorbing member (124 in FIGS. 5, 6, and 8) and a barrier 130 not including the heat absorbing member 124 in FIGS. 5, 6, and 8. In order to avoid confusion of terms, in the following description, the barrier 120 including the heat absorbing member (124 in FIGS. 5, 6, and 8) is defined as a "barrier" and the barrier 130 not including the heat absorbing member (124 in FIGS. 5, 6, and 8) is defined as a "sub-barrier".

In exemplary embodiments, the battery sub-module 110 may be supported on both sides by the barrier 120 and the sub-barrier 130. For example, as illustrated in FIG. 2, the battery module 100 may include the barrier 120 disposed on one side surface of the battery sub-module 110 and a sub-barrier 130 disposed on the other side surface of the battery sub-module 110 and having a different thickness from that of the barrier 120. Since the sub-barrier 130 is not provided with the heat absorbing member (124 in FIGS. 5, 6, and 8), the sub-barrier 130 may have a thickness thinner than that of the barrier 120.

However, the illustration of FIG. 2 is only an example, and all the battery modules 100 according to the exemplary embodiments may include only the barrier 120 having the heat absorbing member (124 in FIGS. 5, 6 and 8).

In the battery module 100 according to the exemplary embodiments, the barrier 120 or the sub-barrier 130 may be alternately disposed between the battery sub-modules 110 adjacent to each other. For example, as illustrated in FIG. 1 or 2, the barrier 120 and the sub-barrier 130 may be alternately disposed between the battery sub-modules 110. However, FIG. 1 or 2 is only an example, and the disposition method of the barrier 120 and the sub-barrier 130 may vary in exemplary embodiments. For example, the sub-barrier 130 may be disposed after the barrier 120 is continuously disposed two or more times between the battery sub-modules 110 adjacent to each other, and conversely, the barrier 120 may be disposed after the sub-barrier 130 is continuously disposed two or more times. That is, a pattern in which the battery sub-module 110, the barrier 120, and the sub-barrier 130 are disposed in the battery module 100 according to the exemplary embodiments may not be uniform.

In exemplary embodiments, the barrier 120 may be provided to be thicker than that of the sub-barrier 130. The barrier 120 and the sub-barrier 130 basically function to reduce heat conduction or heat radiation between the battery sub-modules 110 adjacent to each other. The thicker the barrier 120 and the sub-barrier 130, the better this function may be performed. However, since the energy density of the battery module 100 decreases as the thickness of the barrier 120 and the sub-barrier 130 increases, the thickness of the barrier 120 and the sub-barrier 130 may be provided at a level that does not excessively decrease efficiency.

The barrier 120 according to the exemplary embodiments may include a heat absorbing member (e.g., 124 in FIGS. 5, 6, and 8) capable of absorbing heat energy generated by adjacent battery sub-modules 110. For example, the barrier 120 illustrated in FIG. 2 may include a heat absorbing member (124 in FIGS. 5, 6, and 8) capable of absorbing heat energy generated by adjacent battery sub-modules 110. Accordingly, the barrier 120 provided with the heat absorbing member (124 in FIGS. 5, 6, and 8) may more effectively block heat conduction or heat radiation between the battery sub-modules 110 adjacent to each other. In addition, the heat absorbing member (124 in FIGS. 5, 6, and 8) absorbs heat energy of the battery cell to prevent thermal deformation of the barrier 120.

In exemplary embodiments, the amount of the heat absorbing member (124 in FIGS. 5, 6, and 8) provided in the plurality of barriers 120 included in the battery module 100 may be different from each other. For example, the amount of heat absorbing members provided in any one of barriers 120 may be greater than the amount of heat absorbing members provided in other adjacent barriers 120. In the battery module 100 according to the exemplary embodiments, the barriers 120 having different amounts of heat absorbing members (124 in FIGS. 5, 6, and 8) may be alternately disposed to maximize a heat absorption effect while maintaining the energy density of the entire battery module 100.

Hereinafter, the battery sub-module 110 included in the battery module 100 according to exemplary embodiments will be described in detail with reference to FIG. 3.

Figure 3:
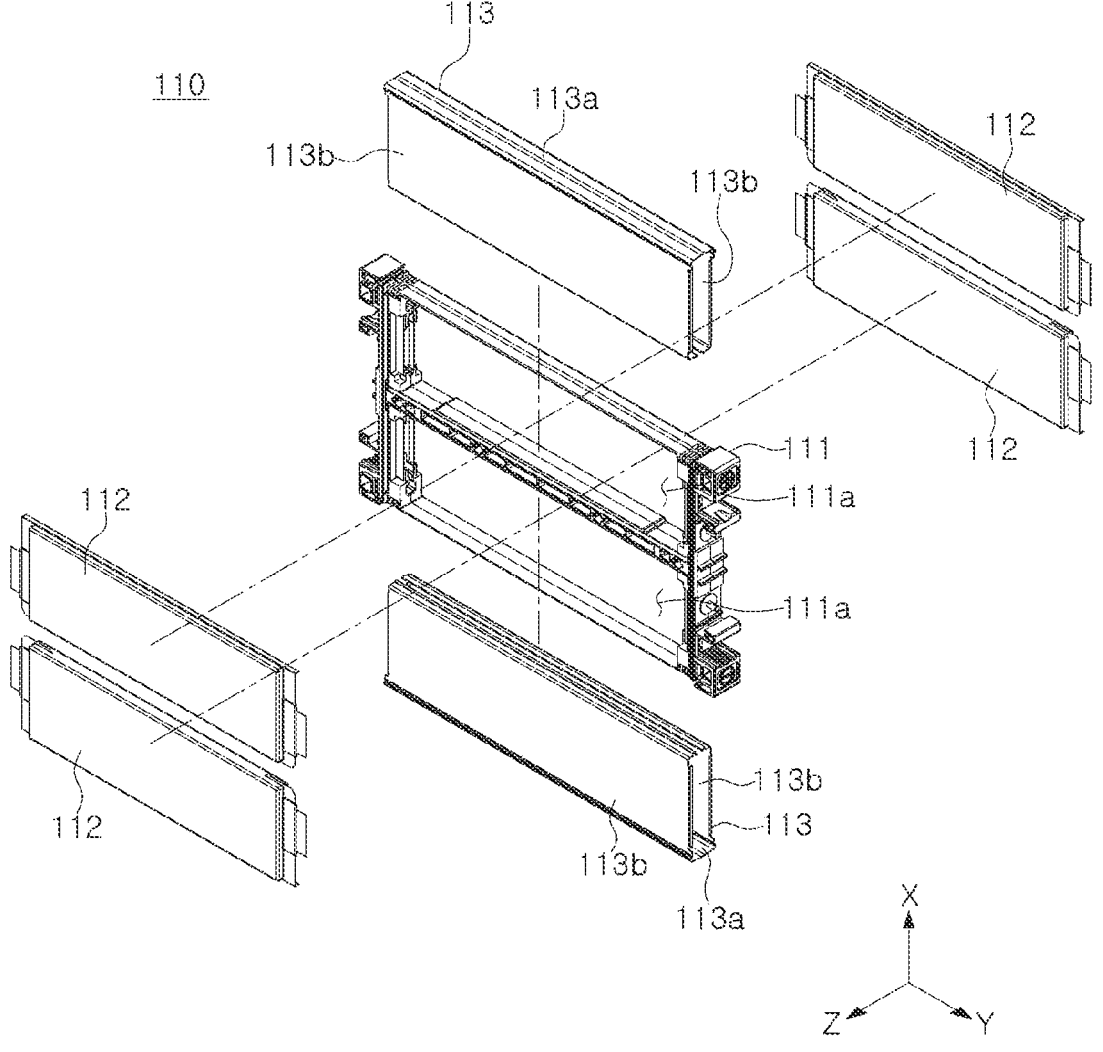
FIG. 3 is a perspective view of a battery sub-module according to exemplary embodiments.

FIG. 3 is a perspective view of a battery sub-module 110 according to exemplary embodiments. The battery sub-module 110 described in FIG. 3 corresponds to the battery sub-module 110 described in FIGS. 1 and 2 above, and a redundant description thereof will be omitted.

The battery sub-module 110 according to exemplary embodiments may include one or more battery cells 112. For example, as illustrated in FIG. 3, the battery sub-module 110 may include one or more battery cells 112 and a cell support member 111 in which the battery cells 112 are accommodated.

Any one of the battery cells 112 according to the exemplary embodiments may include an electrode assembly and a cell body member surrounding the electrode assembly.

The electrode assembly is used while being accommodated in the cell body member, including substantially an electrolyte. The electrolyte included in the battery cell 112 may be in the form of a liquid, a solid, or a gel. Examples of the electrolyte may include lithium salts such as $LiPF_6$ and $LiBF_4$ contained in organic solvents such as ethylene carbonate (EC), propylene carbonate (PC), diethyl carbonate (DEC), ethyl methyl carbonate (EMC), and dimethyl carbonate (DMC).

The cell body member is configured to protect the electrode assembly from external impact. The cell body member may be provided as a pouch-type member or a can-type member. For example, the pouch-type member is a type to accommodate the electrode assembly therein by sealing the electrode assembly from three sides. For Example, the pouch-type member may be configured by sealing the remaining three surfaces (eg, upper and both side surfaces) except for one surface (eg, lower surface) in a state in which the electrode assembly is accommodated therein. In addition, the can-type member may be configured by sealing any one side (eg, upper surface) in a state in which the electrode assembly is accommodated therein.

One or more battery cells 112 according to exemplary embodiments may be accommodated in the cell support member 111. For example, as illustrated in FIG. 3, the cell support member 111 may have a rectangular frame shape surrounding a side portion (or edge) of at least one battery cell 112, and the battery cell 112 may be accommodated in the rectangular frame. In the exemplary embodiment illustrated in FIG. 3, the cell support member 111 may include two spaces 111a partitioned in a vertical direction (e.g., X-axis direction), and a pair of the battery cells 112 may be accommodated in each of the spaces 111a. A pair of battery cells 112 accommodated in one space 111*a* may be in close contact with each other. However, what is illustrated in FIG. 3 is only an example, and in exemplary embodiments, the structure of the cell support member 111 or the number of battery cells 112 accommodated in the cell support member 111 is provided differently from the illustrated exemplary embodiment.

The battery sub-module 110 according to the exemplary embodiments may further include a case 113 surrounding at least a portion of the battery cell 112 accommodated in the cell support member 111. As illustrated in FIG. 3, any one side of each of the pair of battery cells 112 accommodated in the space 11*a* on one side of the cell support member 111 may be exposed to the outside, and the case 113 may be provided in a shape surrounding the exposed side surfaces of the pair of battery cells 112. For example, the case 113 may include an upper plate 113*a* and side plates 113*b* extending side by side in the same direction from both ends of the upper plate 113*a*, and thus, may include an inner space surrounded by an upper plate 113*a* and two side plates 113*b*. The case 113 may be coupled to the cell support member 111 so that a pair of battery cells 112 are positioned in the inner space thereof, so the side plates 113*b* on both sides of the case 113 may surround and cover the side surfaces of the pair of battery cells 112. In exemplary embodiments, the case 113 may be configured to press the battery cells 112 positioned in the inner space in a direction in which both side plates 113*b* oppose each other.

In exemplary embodiments, the case 113 may be formed of a metal material to prevent flame propagation of the battery cell 112. The case 113 may be formed of a metal material, for example, iron (Fe) or aluminum (Al). Alternatively, the case 113 may be formed of a single metal material or an alloy material that maintains its shape even when heat of a high temperature (e.g., a temperature of 800° C. or higher) generated by the battery cell is applied. That is, the material of the case 113 may be formed of a metal material that maintains its shape at a high temperature or an alloy material in which a plurality of metals are mixed. In exemplary embodiments, the case 113 may be formed of a metal material, and thus may also perform a cooling action of discharging heat generated by the battery cell 112 to the outside. In exemplary embodiments, the case 113 may be configured to absorb heat energy generated by the battery cell 112 and radiate the absorbed heat to the outside of the battery sub-module 110.

Heat energy generated by the battery cell 112 and radiated to the outside of the battery sub-module 110 may propagate to other adjacent battery sub-modules, and thus, is likely to affect electrical performance of other adjacent battery sub-modules or apply a thermal shock to the adjacent battery sub-modules. Alternatively, there is a possibility that the flames generated by any one of the battery sub-modules 110 may be transferred to other adjacent battery sub-modules to cause a chain ignition. To prevent this, the battery module according to exemplary embodiments may include a barrier (e.g., 120 in FIG. 2) that is disposed between adjacent battery sub-modules 110 to serve as a barrier.

Hereinafter, the barrier 120 according to the exemplary embodiments will be described in detail with reference to FIGS. 4 to 9.

Figure 4:
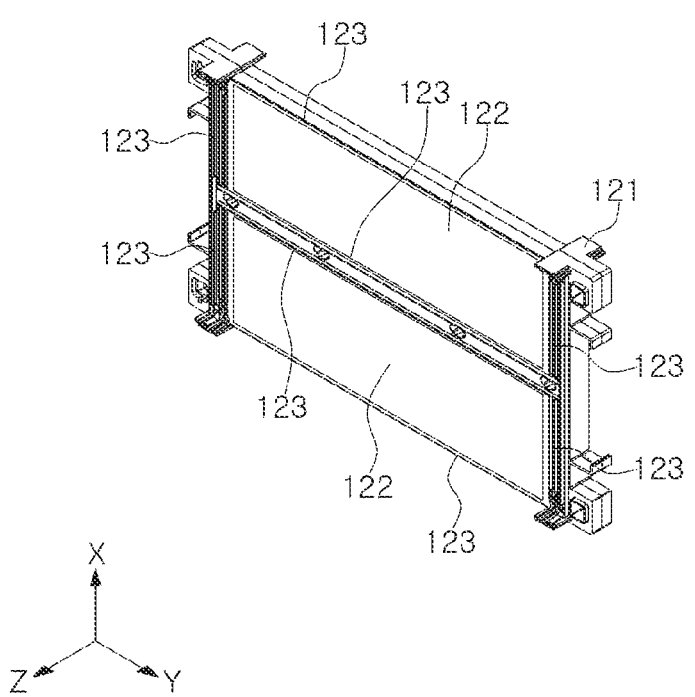
FIG. 4 is a perspective view of a barrier according to exemplary embodiments.

FIG. 4 is a perspective view of the barrier 120 according to exemplary embodiments. The barrier 120 described with reference to FIG. 4 corresponds to the barrier 120 described with reference to FIGS. 1 to 3, and a redundant description thereof will be omitted.

The barrier 120 according to the exemplary embodiments may be disposed between adjacent battery sub-modules (110 in FIGS. 1 to 3) to physically support the battery sub-modules (110 in FIGS. 1 to 3) and at the same time act as a barrier between the battery sub-modules (110 in FIGS. 1 to 3), thereby preventing a fire from being transferred between adjacent battery sub-modules (110 in FIGS. 1 to 3).

The barrier 120 according to the exemplary embodiments may include a rigid member 121 constituting a skeleton of the barrier 120 and a heat absorbing member (e.g., 124 in FIGS. 5, 6 and 8) accommodated inside or outside of the rigid member 121.

The rigid member 121 according to exemplary embodiments may press and support at least a portion of the battery sub-module (110 of FIGS. 1 to 3). The rigid member 121 may be formed of a thermosetting polymer material that maintains its shape even at a temperature of 800° C. or higher, a polyphenylene sulfide material, or a material containing at least gypsum. Alternatively, the rigid member 121 may be formed of a metal material. For example, the rigid member 121 may include aluminum having excellent heat resistance, fire resistance, or chemical resistance while being lightweight. However, the material of the rigid member 121 is not limited thereto, and may be formed of any material that may maintain its shape even when heat is applied. That is, the rigid member 121 is made of a material having a fire resistance, so that the flames or gas generated by any one of adjacent battery sub-module (110 in FIGS. 1 to 3) may be prevented from being transferred to other battery sub-modules.

In exemplary embodiments, the rigid member 121 may include the base 122 and the protruding portion 123 protruding from the edge of the base 122 in a direction (e.g., in Z direction) toward the battery sub-module (110 in FIGS. 1 to 3).

The base 122 may extend between both ends of the barrier 120 in the longitudinal direction to form a side surface of the barrier 120. When the barrier 120 is disposed adjacent to the battery sub-module (110 in FIGS. 1 to 3), the base 122 may be disposed to oppose the side plate of the case that surrounds one side surface of a battery cell (e.g., 112 in FIG. 3) included in the battery sub-module (110 in FIGS. 1 to 3) or one side surface of the battery cell (112 in FIG. 3).

In exemplary embodiments, one or more bases 122 may be formed on any one side of the barrier 120. For example, as illustrated in FIG. 4, the base 122 may be formed one by one at the upper end and the lower end of one side of the barrier 120, respectively, and accordingly, may be provided to correspond to each of the side surfaces of the battery cell (112 in FIG. 3) accommodated in the vertical direction (X-axis direction in FIG. 3) in the battery sub-module (110 in FIGS. 1 to 3) adjacent to the barrier 120.

In exemplary embodiments, the base 122 of the barrier 120 may be formed in the form of a bellows, and accordingly, may elastically absorb high-pressure energy caused by the explosion generated in the battery sub-module (110 in FIGS. 1 to 3) on one side of the barrier 120 to protect the battery sub-module on the other side of the barrier 120 from the high-pressure energy. For example, when the high-pressure gas generated by the explosion presses the base 122, the bellows-shaped base 122 may be elastically deformed to have a flat shape to absorb high-pressure impact energy. Accordingly, it is possible to reduce the effect of the explosion energy generated by the battery sub-modules (110 in FIGS. 1 to 3) positioned on one side of the barrier 120 on the other battery sub-modules positioned on the other side of the barrier 120.

The protruding portion 123 may protrude from at least a partial surface of the base 122 in a direction (e.g., Z-axis direction) toward adjacent battery sub-modules (110 in FIGS. 1 to 3). The protruding portion 123 may be configured to press at least a portion of the battery sub-module (110 in FIGS. 1 to 3) inwardly of the battery sub-module (110 in FIGS. 1 to 3). Here, the inward direction of the battery sub-module may refer to a direction from the outer surface of the battery sub-module toward the inside of the battery sub-module. For example, when the case (113 in FIG. 3) is provided to surround the battery cell, the protruding portion 123 of the rigid member 121 may press a portion of the case (113 in FIG. 3) inwardly of the battery sub-module (110 in FIGS. 1 to 3) to prevent the case (113 in FIG. 3) from being separated from the cell support member (111 in FIG. 3).

In exemplary embodiments, the protruding portion 123 may protrude from the edge of the base 122. Accordingly, in the barrier 120 according to the exemplary embodiments, the thickness of the edge at which the protruding portion 123 is provided may be thicker than the thickness of the central portion at which the base 122 is provided.

In exemplary embodiments, a separation space, that is, an air gap (e.g., G in FIG. 7) may be formed between the barrier 120 and the battery sub-module (110 in FIGS. 1 to 3) adjacent to the barrier 120. For example, the barrier 120 may contact the battery sub-module (110 in FIGS. 1 to 3) adjacent to the barrier 120 through the protruding portion 123, and a portion (e.g., at least a partial surface of the base 122) other than the protruding portion 123 of the barrier 120 may be spaced apart from the battery sub-module (110 in FIGS. 1 to 3) to form an air gap (G in FIG. 7) therebetween. That is, as illustrated in FIG. 4, the protruding portion 123 of the barrier 120 may further protrude from the base 122 toward the battery sub-module (110 in FIGS. 1 to 3) to contact the battery sub-module (110 in FIGS. 1 to 3), and thus, the base 122 of the barrier 120 and the side surfaces of the battery sub-modules (110 in FIGS. 1 to 3) may be spaced apart to form an air gap (G in FIG. 7). The air gap (G in FIG. 7) generated between the barrier 120 and the battery sub-module (110 in FIGS. 1 to 3) may prevent or reduce a transfer rate of the heat or flames to other adjacent battery sub-modules (110 in FIGS. 1 to 3) even if the heat or flames is generated in any one of the battery sub-modules (110 in FIGS. 1 to 3). In addition, the air gap (G in FIG. 7) may act as a buffer space when a swelling phenomenon of the battery cell (112 in FIG. 3) occurs.

The barrier 120 according to exemplary embodiments may include a heat absorbing member (e.g., 124 in FIGS. 5, 6 and 8) accommodated outside or inside the rigid member 121. The heat absorbing member (124 in FIGS. 5, 6, and 8) may absorb heat energy generated by the adjacent battery sub-module (110 in FIGS. 1 to 3) and may prevent the transfer of the heat energy to other battery sub-modules, and at the same time, may prevent the rigid member 121 from being deformed in its shape and structurally collapsed due to the heat energy.

Hereinafter, the heat absorbing member and the barrier 120 having the same according to exemplary embodiments will be described in detail with reference to FIGS. 5 and 6.

FIG. 5 is an exploded perspective view of the barrier 120 according to exemplary embodiments. The barrier 120 described in FIG. 5 includes all the features of the barrier 120 described in FIG. 4 above, and a redundant description thereof will be omitted.

The barrier 120 according to exemplary embodiments may include the rigid member 121 and one or more heat absorbing members 124 accommodated in the rigid member 121.

The rigid member 121 according to the exemplary embodiments may be provided to be coupled to a plurality of plates 121a and 121b. For example, as illustrated in FIG. 5, the rigid member 121 may be provided by coupling the first plate 121a and the second plate 121b to oppose each other.

The first plate 121a and the second plate 121b may be formed of a material having rigidity to physically support the adjacent battery sub-modules (110 in FIGS. 1 to 3). For example, at least one of the first plate 121a or the second plate 121b may be formed of a thermosetting polymer material, a polyphenylene sulfide material, or a material including at least gypsum.

The first plate 121a and the second plate 121b may each be provided with a base and a protruding portion on one side opposing each other and the other side opposite to each other.

The base and the protruding portion referred to herein correspond to the base 122 and the protruding portion 123 described above with reference to FIG. 4, and a detailed description thereof may refer to FIG. 4.

The first plate 121a and the second plate 121b may be coupled to each other to form one rigid member 121. In exemplary embodiments, the rigid member 121 may further include auxiliary members 127 and 128 for fastening the first plate 121a and the second plate 121b. For example, as illustrated in the partially enlarged view of FIG. 5, the fastening protrusion 127a may be provided on at least some surface of the first plate 121a in contact with the second plate 121b. A fastening groove (not illustrated) may be provided in the second plate 121b to correspond to the fastening protrusion 127a of the first plate 121a. The fastening protrusion 127a of the first plate 121a may be inserted into the fastening groove (not illustrated) of the second plate 121b to increase the bonding strength between the first plate 121a and the second plate 121b. In exemplary embodiments, the fastening protrusion 127a may be provided on at least some surface of the first plate 121a, and a fastening groove 127b may be provided on another some surface of the first plate 121a. Correspondingly, the second plate 121b may be provided with a fastening groove (not illustrated) opposing the fastening protrusion 127a of the first plate 121a and a fastening protrusion (not illustrated) opposing the fastening groove 127b of the first plate 121a.

As another example of the auxiliary members 127 and 128 for fastening, a bolt 128b inserted into a screw groove 126a penetrating through the first plate 121a and the second plate 121b and a nut 128a coupled to the bolt 128b may be provided. As illustrated in FIG. 5, the bolt 128b may be inserted into the screw groove 126a penetrating through the first plate 121a and the second plate 121b, and the nut 128a may be coupled to the end portion of the bolt 128b, so the first plate 121a and the second plate 121b may be pressed from both sides in a coupled state. In exemplary embodiments, the nut 128a may be integrally formed with the first plate 121a or the second plate 121b, or a thread corresponding to the bolt 128b may be formed in the screw groove 126a and the nut 128a may be omitted. As the auxiliary members 127 and 128 for coupling the first plate 121a and the second plate 121b are provided, it is possible to prevent the first plate 121a and the second plate 121b from being misaligned or twisted when the pressure due to the fire or explosion of the battery cell (112 in FIG. 3) is applied to the rigid member 121.

At least one of the first plate 121*a* or the second plate 121*b* may include a accommodating portion 125 that may accommodate the heat absorbing member 124. For example, as illustrated in FIG. 5, the first plate 121*a* may include a accommodating portion 125 formed by recessing at least a portion of a surface opposing the second plate 121*b*, and thus, at least a portion of the heat absorbing member 124 may be accommodated in the inner space of the accommodating portion 125. Meanwhile, the second plate 121*b* may have a accommodating portion at a position corresponding to the accommodating portion 125 of the first plate 121*a*, and thus, the first plate 121*a* and the second plate 121*b* may be coupled to form the accommodating portion 125 having sufficient space to accommodate the heat absorbing member 124.

The first plate 121*a* and the second plate 121*b* of the rigid member 121 according to the exemplary embodiments are coupled to oppose each other, and the heat absorbing member 124 accommodated in the accommodating portion 125 may be separated from the outside of the rigid member 121. Here, the outside of the rigid member 121 is a space of the outer portion of the outer surface of the rigid member 121, and may mean a space separated from the space of the accommodating portion 125 formed by the coupling of the first plate 121*a* and the second plate 121*b*. That is, the first plate 121*a* and the second plate 121*b* may be coupled to oppose each other, thereby separating the space of the accommodating portion 125 and the outer portion of the rigid member 121 from each other. Also, in exemplary embodiments, the first plate 121*a* and the second plate 121*b* surround the outside of the heat absorbing member 124 to prevent the heat absorbing member 124 from leaking to the outside of the accommodating portion 125.

In the barrier 120 according to exemplary embodiments, one or more accommodating parts 125 may be provided. In exemplary embodiments, the plurality of accommodating parts 125 may be formed, and the plurality of accommodating parts 125 may include a first accommodating portion 125*a* and a second accommodating portion 125*b* which are formed to extend side by side in the same direction. For example, as illustrated in FIG. 5, the accommodating portion 125 includes the first accommodating portion 125*a* and the second accommodating portion 125*b* formed to extend side by side in the longitudinal direction (e.g., the Y-axis direction) of the rigid member 121, respectively. Accordingly, one or more heat absorbing members 124 may be accommodated in each of the first accommodating portion 125*a* and the second accommodating portion 125*b*. However, FIG. 5 is only an example, and the first accommodating portion 125*a* and the second accommodating portion 125*b* may be formed to extend in the width direction (e.g., X-axis direction) of the rigid member 121.

A partition wall 126 may be provided between the first accommodating portion 125*a* and the second accommodating portion 125*b* to partition the first accommodating portion 125*a* and the second accommodating portion 125*b*. For example, as illustrated in FIG. 5, the first plate 121*a* may be a partition wall 126 having a partition shape extending in the longitudinal direction of the first plate 121*a* between the first accommodating portion 125*a* and the second accommodating portion 125*b*. The second plate 121*b* may also include a partition wall at a position corresponding to the partition wall 126 of the first plate 121*a*, and the partition wall 126 of the first plate 121*a* and the partition wall of the second plate

121*b* may contact each other to form one partition wall partitioning the first accommodating portion 125*a* and the second accommodating portion 125*b*. That is, as the first plate 121*a* and the second plate 121*b* are coupled, the accommodating portion 125 according to the exemplary embodiments may be divided into the first accommodating portion 125*a* and the second accommodating portion 125*b* arranged vertically with respect to the partition wall 126.

In exemplary embodiments, the accommodating portion 125 may be formed to correspond to the position of the battery cell (112 of FIG. 3) included in the battery submodule (110 in FIGS. 1 to 3) adjacent to the barrier 120. For example, the first accommodating portion 125*a* and the second accommodating portion 125*b* illustrated in FIG. 5 may be arranged in the vertical direction (X-axis direction) inside the barrier 120, and may be provided to correspond to the positions of the battery cells (112 in FIG. 3) included in the battery sub-modules (110 in FIGS. 1 to 3) adjacent to the barrier 120. In addition, at least one of the first accommodating portion 125*a* or the second accommodating portion 125*b* may have an area corresponding to a side area of one battery cell (112 in FIG. 3) included in the battery sub-module (110 in FIGS. 1 to 3). Accordingly, the heat absorbing member 124 accommodated in the first accommodating portion 125*a* or the second accommodating portion 125*b* may be provided to have an area corresponding to the side area of one battery cell (112 in FIG. 3). As the heat absorbing member 124 has an area corresponding to that of the battery cell (112 in FIG. 3), the heat absorbing member 124 may cover all side surfaces of the battery cell to effectively absorb heat energy.

The heat absorbing member 124 according to the exemplary embodiments may be accommodated in the accommodating portion 125 of the first plate 121*a* and the second plate 121*b* to absorb the heat energy generated by the adjacent battery sub-modules (110 in FIGS. 1 to 3). The heat absorbing member 124 may be formed of a material capable of absorbing the heat energy of the surrounding environment. For example, the heat absorbing member 124 may include a hydrogel. The hydrogel is a synthetic polymer material capable of absorbing moisture corresponding to several tens to several thousand times its own mass, and may refer to a polymer having a property of absorbing a fluid to form a gel. For example, the hydrogel may include one or more of the following materials: an absorbent resin (or super absorbent polymer), polyacryl amide, polyacrylic acid, polymethacrylic acid, polyethylene oxide, polyvinyl alcohol, gelatin, polysaccarides, sodium carboxyl methyl cellulose, and chitosan. However, these materials are only some exemplary materials constituting the hydrogel according to the exemplary embodiments, and the hydrogel may be formed of any material as long as it has a function of absorbing a fluid and retaining the absorbed fluid under a predetermined pressure. The hydrogel included in the heat absorbing member 124 according to the exemplary embodiments may be provided in a semi-solid gel state absorbing a liquid (e.g., water), and the liquid absorbed by the hydrogel may absorb the heat energy of the surrounding environment. Accordingly, the heat absorbing member 124 may absorb heat energy due to the fire or explosion generated by the battery cell (112 in FIG. 3) and cool the rigid member 121, thereby preventing the deformation or damage of the barrier 120 due to the heat and furthermore, preventing the structural collapse of the entire battery module (e.g., 100 in FIG. 1). However, the material of the heat absorbing member 124 according to the exemplary embodiments is not limited to the hydrogel, and any material capable of absorbing the heat energy may be used.

The heat absorbing member 124 may be accommodated in the accommodating portion 125 provided in the rigid member 121. For example, as illustrated in FIG. 5, the heat absorbing member 124 may be accommodated in the first accommodating portion 125*a* and the second accommodating portion 125*b*, respectively. In exemplary embodiments, the heat absorbing member 124 accommodated in the first accommodating portion 125*a* or the second accommodating portion 125*b* may be provided at a size corresponding to the area of the battery cell (112 in FIG. 3) accommodated in the battery sub-module (110 in FIGS. 1 to 3).

In exemplary embodiments, an adhesive member (not illustrated) may be further provided between the accommodating portion 125 and the heat absorbing member 124. For example, the adhesive or the pressure-sensitive adhesive capable of adhering the heat absorbing member 124 to the accommodating portion 125 may be further provided in a portion where the heat absorbing member 124 comes into contact with the accommodating portion 125, and thus, the heat absorbing member 124 may be in close contact with the inner side surface of the rigid member 121 to have a fixed position. Since the heat absorbing member 124 is in close contact with the inner surface of the rigid member 121, the heat conduction from the rigid member 121 to the heat absorbing member 124 may occur more smoothly, thereby increasing the heat absorption rate and efficiency.

Meanwhile, as illustrated in FIG. 6, in exemplary embodiments, the first accommodating portion 125*a* and the second accommodating portion 125*b* of the rigid member 121 may be provided in communication with each other. For example, the rigid member 121 may further include a connection portion 125*c* for connecting the first accommodating portion 125*a* and the second accommodating portion 125*b* through the partition wall 126, and thus, the heat absorbing member 124 may be integrally provided to be accommodated over the first accommodating portion 125*a*, the second accommodating portion 125*b*, and the connection portion 125*c*. In exemplary embodiments, when the connection portion 125*c* is located in the center of the first accommodating portion 125*a* and the second accommodating portion 125*b* extending side by side to each other, the heat absorbing member 124 may be provided in an "H" shape to correspond to the shape of the accommodating portion 125.

Hereinafter, a portion accommodated in the first accommodating portion 125*a* of the heat absorbing member 124 is defined as a first portion, a portion accommodated in the second accommodating portion 125*b* is defined as a second portion, and a portion accommodated in the connection portion 125*c* is defined as the connected portion.

As the heat absorbing member 124 may be provided integrally with the accommodating portion 125 of the rigid member 121, it is possible to more effectively absorb the heat energy intensively generated in any one of the battery cells (112 in FIG. 3). For example, when the heat or flames may be generated in any one of battery cell (112 in FIG. 3) facing the first portion of the heat absorbing member 124 among the plurality of battery cells accommodated in the battery sub-module (110 in FIG. 3), the heat energy absorbed in the first portion of the heat absorbing member 124 may be transferred to the second portion through the connection part. Accordingly, all parts including the first portion, the second portion, and the connection portion of the heat absorbing member 124 may absorb heat energy, so more heat energy from any one of the battery cells (112 in FIG. 3)

may be absorbed. That is, as the heat absorbing member 124 is integrally formed inside the rigid member 121, even if the heat energy is intensively generated in any one of the battery cells (112 in FIG. 3), the heat may be effectively absorbed and the battery sub-module (110 in FIG. 3) and the rigid member 121 may be cooled quickly.

Meanwhile, in the barrier 120 according to the exemplary embodiment of FIG. 6, the remaining features except for the connection portion 125*c* and the integrally formed heat absorbing member 124 correspond to the features of the barrier 120 described in FIG. 5, and therefore, a description thereof may refer to FIG. 5.

Figure 7:
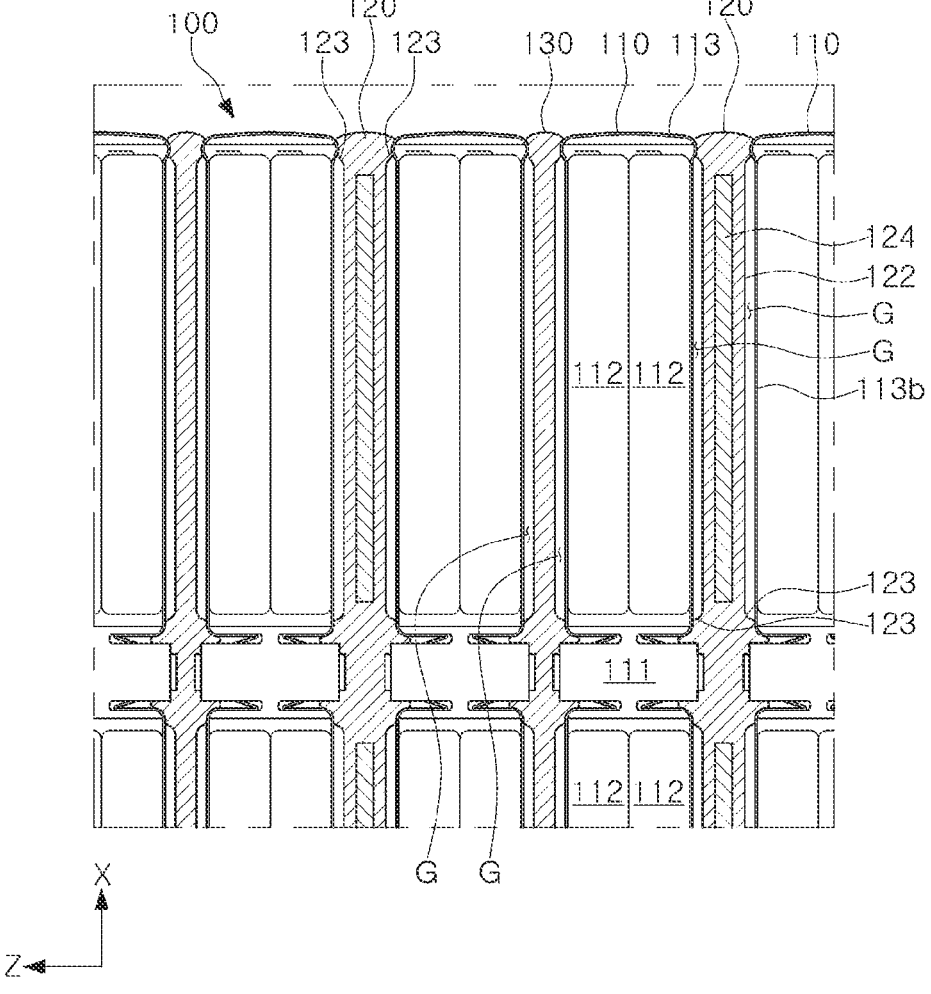
FIG. 7 is a partial cross-sectional view taken along line I-I' of FIG. 1.

FIG. 7 is a partial cross-sectional view taken along line I-I' of FIG. 1. The battery module 100 and its detailed configuration described in FIG. 7 include all the features of the battery module (e.g., 100 in FIG. 1) according to the exemplary embodiments described in FIGS. 1 to 6 above, and an overlapping description thereof will be omitted.

The battery module 100 according to exemplary embodiments may include a battery sub-module 110, a barrier 120, and a sub-barrier 130 stacked in one direction. For example, as illustrated in FIG. 7, the barrier 120 may be disposed on one side of any one of the battery sub-modules 110, and the sub-barrier 130 having a thinner thickness than the barrier 120 on the other side may be disposed on the other side. Here, the barrier 120 may correspond to the barrier 120 described above with reference to FIGS. 1 to 6, and the sub-barrier 130 may correspond to the sub-barrier 130 described with reference to FIGS. 1 and 2.

The barrier 120 or the sub-barrier 130 may press and support at least a portion of the battery sub-module 110. For example, as illustrated in FIG. 7, the barrier 120 may include a protruding portion 123 protruding in a direction toward the adjacent battery sub-module 110, and the protruding portion 123 may press and support adjacent battery sub-modules 110.

The battery sub-module 110 according to the exemplary embodiments may further include a case 113 covering the side of the battery cell 112. In this case, the protruding portion 123 of the barrier 120 and the sub-barrier 130 may press and support at least a portion of the case 113. The side plate 113*b* of the case 113 may be in close contact with the side surface of the battery cell 112 by the force applied by the protruding portion 123. In addition, the protruding portion 123 may prevent the case 113 from opening the side plate 113*b* to the outside of the battery sub-module 110.

The barrier 120 according to the exemplary embodiments may be disposed such that the base 122 opposes the side plate 113*b* of the case 113 included in the battery sub-module 110. In this case, the air gap G may be formed between the base 122 of the barrier 120 and the side plate 113*b* of the battery sub-module 110. For example, as illustrated in FIG. 7, a predetermined space, that is, an air gap G, may be formed between the base 122 and the side plate 113*b* of the barrier 120. The air gap G formed between the battery sub-module 110 and the barrier 120 may prevent the heat or flames generated by the battery sub-module 110 from propagating to other adjacent battery sub-modules 110, or may reduce the propagation rate of the heat or flames. In addition, the air gap (G in FIG. 7) may act as the buffer space when the swelling phenomenon of the battery cell (112 in FIG. 3) occurs. Meanwhile, the air gap G capable of performing the same function may also be formed between the sub-barrier 130 and the battery sub-module 110.

In exemplary embodiments, the base 122 of the barrier 120 opposing the side plate 113*b* of the case 113 may further include a buffer pad (not illustrated) that absorbs the expan-

| sion pressure of the battery cell 112 according to the swelling phenomenon of the battery cell 112.

The heat absorbing member 124 may be accommodated inside the barrier 120 included in the battery module according to the exemplary embodiment. For example, as illustrated in FIG. 7, the heat absorbing member 124 may be accommodated in the accommodating portion (e.g., 152 in FIGS. 5 and 162 in FIG. 6) inside the barrier 120 disposed between the battery sub-modules 110 adjacent to each other. The heat absorbing member 124 may absorb the heat energy generated by the battery cells 112 of the adjacent battery sub-modules 110, and thus, may prevent the heat or flames generated by any one of the battery sub-modules 110 from being transferred to other adjacent battery sub-modules 110.

In other exemplary embodiments, the heat absorbing member may be accommodated on the side surface of the barrier 120. Hereinafter, the barrier 120 having the heat absorbing member on the side thereof will be described with reference to FIGS. 8 and 9.

Figure 9:
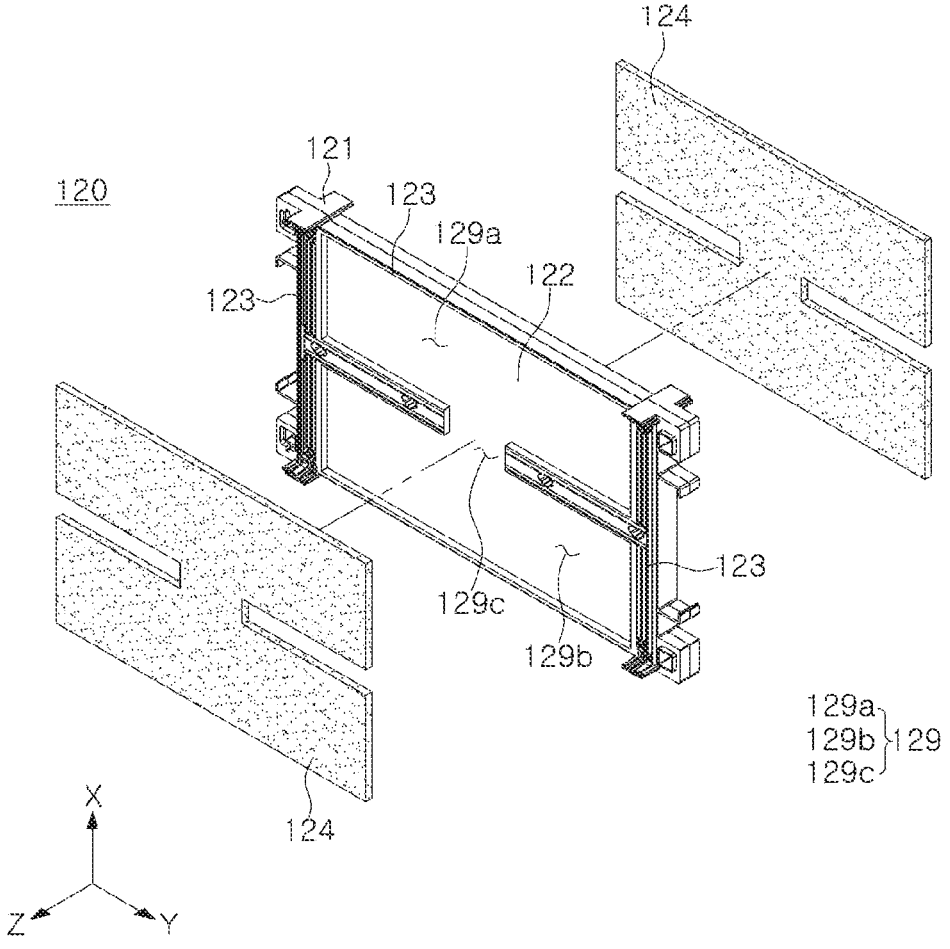
FIG. 9 is an exploded perspective view of the barrier according to other exemplary embodiments.

FIG. 8 is a perspective view of the barrier 120 according to exemplary embodiments, and FIG. 9 is an exploded perspective view of the barrier 120 according to exemplary embodiments. The barrier 120 described in FIG. 8 includes all the features of the barrier 120 described in FIG. 4 above, and a redundant description thereof will be omitted.

The barrier 120 may include the rigid member 121 and a heat absorbing member 124 accommodated in at least one of both sides of the rigid member 121. Accordingly, the heat absorbing member 124 may be disposed to oppose the battery sub-module (110 in FIGS. 2 and 3) adjacent to the barrier 120 to quickly absorb the heat energy generated by the battery cell (112 in FIG. 3).

In exemplary embodiments, the rigid member 121 of the barrier 120 may include a accommodating groove 129 in which the heat absorbing member 124 is accommodated and the protruding portion 123 for pressing the battery sub-module (110 in FIGS. 2 and 3). For example, the accommodating groove 129 in which the heat absorbing member is accommodated may be formed in the base 122 forming the side surface of the rigid member 121. The protruding portion 123 may protrude in a direction (for example, in Z-axis direction) toward the adjacent battery sub-modules (110 in FIGS. 2 and 3) from at least some surface of the base 122 in which the accommodating groove 129 is provided. The protruding portion 123 may press and support at least a portion of the battery sub-module (110 in FIGS. 2 and 3) adjacent to the barrier 120. The protruding portion 123 according to the exemplary embodiments corresponds to the protruding portion 123 according to the exemplary embodiments described above with reference to FIG. 4, and a detailed description thereof may refer to FIG. 4.

The accommodating groove 129 of the barrier 120 according to the exemplary embodiments is formed on the side surface of the rigid member 121 and is positioned inside the protruding portion 123. Accordingly, in the barrier 120 according to the exemplary embodiments, the thickness of the portion at which the protruding portion 123 is provided may be thicker than the thickness of the portion at which the accommodating groove 129 is provided.

The accommodating groove 129 in which the heat absorbing member 124 may be accommodated may be provided on a side surface of the rigid member 121. The heat absorbing member 124 may be accommodated in the accommodating groove 129 of the rigid member 121, and when the barrier 120 is disposed adjacent to the battery sub-module (110 in FIGS. 1 to 3), may be positioned between the rigid member 121 and the battery sub-module (110 in FIGS. 1 to 3). In exemplary embodiments, one or more accommodating grooves 129 may be provided on one side of the rigid member 121. In exemplary embodiments, a plurality of accommodating grooves 129 may be formed, and the plurality of accommodating grooves 129 may include a first accommodating groove 129a and a second accommodating groove 129b which are formed to extend side by side in the same direction. Accordingly, one or more heat absorbing members 124 may be accommodated in the first accommodating groove 129a and the second accommodating groove 129b, respectively. For example, the barrier 120 may include the first accommodating groove 129a and the second accommodating groove 129b that are formed to extend side by side from one side of the rigid member 121 in the longitudinal direction or the width direction of the rigid member 121.

In exemplary embodiments, the first accommodating groove 129a and the second accommodating groove 129b may be provided to correspond to the position of the battery cell (112 in FIG. 3) included in the battery sub-module (110 in FIGS. 1 to 3) adjacent to the barrier 120. For example, the first accommodating groove 129a and the second accommodating groove 129b may be formed in the vertical direction (X-axis direction) on one side of the rigid member 121, and thus, may be provided to correspond to the position of battery cells included in the battery sub-modules (110 in FIGS. 1 to 3) adjacent to the barrier 120. Also, in exemplary embodiments, at least one of the first accommodating groove 129a or the second accommodating groove 129b may have an area corresponding to a side surface of one battery cell (112 in FIG. 3) accommodated in the battery sub-module (110 in FIGS. 1 to 3).

The heat absorbing member 124 according to the exemplary embodiments may be accommodated in the accommodating groove 129 of the rigid member 121 to absorb the heat energy generated by the adjacent battery sub-modules (110 in FIGS. 1 to 3). The heat absorbing member 124 may be formed of a material capable of absorbing the heat energy of the surrounding environment. For example, the heat absorbing member 124 may include a hydrogel. The heat absorbing member 124 described in FIGS. 8 and 9 may be formed of the same material as the heat absorbing member 124 described with reference to FIG. 5, and thus, a detailed description thereof may refer to FIG. 5.

The heat absorbing member 124 according to exemplary embodiments may be provided to absorb the heat energy of the surrounding environment through an endothermic reaction of the liquid absorbed by the super absorbent polymer material. The heat absorbing member 124 may absorb heat energy due to the fire or explosion generated by the battery cell (112 in FIG. 3) and cool the rigid member 121, thereby preventing the deformation or damage of the barrier 120 due to the heat and furthermore, preventing the structural collapse of the entire battery module (100 in FIG. 1).

The heat absorbing member 124 according to the exemplary embodiments may be provided to have elasticity, and thus, may protect the rigid member 121 by absorbing the pressure generated due to the swelling phenomenon of the battery cell (112 in FIG. 3) as elastic energy.

In exemplary embodiments, an adhesive member (not illustrated) may be further provided between the accommodating groove 129 and the heat absorbing member 124. For example, the adhesive or the pressure-sensitive adhesive capable of adhering the heat absorbing member 124 to the accommodating groove 129 may be further provided at a portion where the heat absorbing member 124 comes into contact with the accommodating groove 129, and the heat absorbing member 124 may be in close contact with the rigid member 121 by the adhesive force of the adhesive member (not illustrated) to be fixed in position. Accordingly, the heat absorbing member 124 may not be separated from the accommodating groove 129 of the rigid member 121 even by an impact due to the fire or explosion generated by adjacent battery cells (112 in FIG. 3).

In exemplary embodiments, the rigid member 121 may further include a connection groove 129c connecting the first accommodating groove 129a and the second accommodating groove 129b. The first accommodating groove 129a and the second accommodating groove 129b may communicate with each other through the connection groove 129c, and accordingly, the heat absorbing member 124 may be integrally provided to be accommodated over the first accommodating groove 129a, the second accommodating groove 129b, and the connection groove 129c. For example, as illustrated in FIG. 9, the heat absorbing member 124 accommodated in any one side surface of the rigid member 121 may be formed of a single member, and may be accommodated over the first accommodating groove 129a provided on the upper side of the rigid member 121, the second accommodating groove 129b provided on the lower side thereof, and the connection groove 129c connecting the first accommodating groove 129a and the second accommodating groove 129b. For example, when the connection groove 129c is positioned at the center of the first accommodating groove 129a and the second accommodating groove 129b extending parallel to each other, the heat absorbing member 124 may be provided in an "H" shape to correspond to the shape of the accommodating groove 129.

Hereinafter, a portion of the heat absorbing member 124 that is accommodated in the first accommodating groove 129a is defined as a first portion, and a portion accommodated in the second accommodating groove 129b is defined as a second portion, and a portion accommodated in the connection groove 129c is defined as a connection part.

As the heat absorbing member 124 may be provided integrally on one side surface of the rigid member 121, it is possible to more effectively absorb the heat energy intensively generated in any one of the battery cells (112 in FIG. 3). For example, when the heat or flames may be generated in any one of battery cell opposing the first portion of the heat absorbing member 124 among the plurality of battery cells accommodated in the battery sub-module (110 in FIGS. 1 to 3), the heat energy absorbed in the first portion of the heat absorbing member 124 may be transferred to the second portion through the connection part. Accordingly, all portions of the heat absorbing member 124 may participate in the endothermic reaction, so more heat energy may be absorbed from any one of the battery cells (112 in FIG. 3). That is, as the heat absorbing member 124 is integrally formed on one side surface of the rigid member 121, even if the heat energy is intensively generated in any one of the battery cells (112 in FIG. 3), the heat may be effectively absorbed and the battery sub-module (110 in FIGS. 1 to 3) and the rigid member 121 may be cooled quickly.

In exemplary embodiments, the accommodating groove 129 may be provided on both side surfaces of the rigid member 121. That is, the accommodating groove 129 may be provided in the accommodating groove on any one side surface of the rigid member 121 and the accommodating groove on the other side surface of the rigid member 121, respectively. Accordingly, as illustrated in FIG. 9, the heat absorbing member 124 may be accommodated in all the accommodating grooves 129 provided on both side surfaces of the rigid member 121. As the heat absorbing member 124 is provided on both sides, the total amount of heat energy that the barrier 120 may absorb may increase, thereby stably protecting the battery module (100 in FIG. 1) from thermal shock.

In exemplary embodiments, a separation space, that is, an air gap (not illustrated), may be formed between the heat absorbing member 124 accommodated in the rigid member 121 and the adjacent battery sub-modules (110 in FIGS. 1 to 3). For example, when the case is provided in the battery sub-module (110 in FIGS. 1 to 3), the air gap (not illustrated) may be formed between the heat absorbing member 124 accommodated in the rigid member 121 and the side plate (FIG. 3) of the case (113b in FIG. 3). The air gap (not illustrated) formed between the battery sub-module (110 in FIGS. 1 to 3) and the barrier 120 may prevent the heat or flames generated by the battery sub-module (110 in FIGS. 1 to 3) from propagating to other adjacent battery sub-modules (110 in FIGS. 1 to 3), or reduce the propagation rate of the heat or flames. In addition, the air gap (not illustrated) may act as the buffer space when the swelling phenomenon of the battery cell (112 in FIG. 3) occurs.

According to exemplary embodiments, a barrier may be provided between adjacent battery sub-modules to stably support and protect the battery sub-modules.

According to exemplary embodiments, a barrier may accommodate a heat absorbing member to effectively absorb heat energy generated by adjacent battery sub-modules.

According to exemplary embodiments, a heat absorbing member accommodated in a barrier may rapidly cool the barrier to prevent the barrier from collapsing due to heat.

According to exemplary embodiments, a barrier in which the heat absorbing member is accommodated may be disposed between adjacent battery sub-modules to prevent heat or flames generated by any one of the battery sub-modules from being transferred to other adjacent battery sub-modules.

According to exemplary embodiments, a barrier or a sub-barrier may include a protruding portion for pressing adjacent battery sub-modules in a stacking direction to stably support the battery sub-modules.

While exemplary embodiments have been shown and described above, it will be apparent to those skilled in the art that modifications and variations could be made without departing from the scope of the present disclosure as defined by the appended claims. In addition, it may be implemented by deleting some components in the above-described exemplary embodiment, and each exemplary embodiment may be implemented in combination with each other.

What is claimed is:

1. A battery module, comprising:
   a first battery sub-module and a second battery sub-module stacked in a first direction, each of the first and second battery sub-modules including a plurality of battery cells and a side plate at least partially contacting at least one of the plurality of battery cells; and
   a barrier disposed between the side plate of the first battery sub-module and the side plate of the second battery sub-module,
   wherein the barrier includes:
   a first base facing the side plate of the first battery sub-module;
   a second base facing the side plate of the second battery sub-module;
   a heat absorbing member is included in the barrier to absorb heat generated by the battery cells and disposed to overlap with the side plate of the first battery sub-module and the side plate of the second battery sub-module in the first direction;

a protrusion portion continuously extending along an edge region of the first base and an edge region of the second base, respectively, protruding toward the side plate of the first battery sub-module and the side plate of the second battery sub-module, and pressing against an edge region of the side plates of the first and second battery sub-modules in the first direction;

a first air gap enclosed by the first base and the side plate of the first battery sub-module and the protrusion portion; and a second air gap enclosed by the second base and the side plate of the second battery sub-module and the protrusion portion.

2. The battery module of claim 1, wherein the heat absorbing member includes a hydrogel.

3. The battery module of claim 2, wherein the hydrogel included in the heat absorbing member includes at least one of a super absorbent polymer or polyacrylamide.

4. The battery module of claim 1, wherein the heat absorbing member is accommodated between the first base and the second base.

5. The battery module of claim 4, wherein the first base and the second base are coupled to each other to surround the heat absorbing member.

6. The battery module of claim 4, wherein at least one of the first base or the second base includes an accommodating portion in which the heat absorbing member is accommodated, and the first base and the second base are coupled to each other to separate the heat absorbing member accommodated in the accommodating portion from an outside of a rigid member supporting at least one of adjacent battery sub-modules, and wherein the rigid member includes the first base and the second base coupled to oppose each other.

7. The battery module of claim 6, wherein the accommodating portion includes a first accommodating portion and a second accommodating portion extending side by side in the same direction, and a partition wall is provided between the first accommodating portion and the second accommodating portion.

8. The battery module of claim 7, wherein the heat absorbing member comprises a first heat absorbing member accommodated in the first accommodating portion and a second heat absorbing member accommodated in the second accommodating portion, respectively, and at least one of the first and second heat absorbing members is configured to have an area corresponding to any one of the battery cells included in the battery sub-modules.

9. The battery module of claim 7, wherein the accommodating portion further includes a connection portion connecting the first accommodating portion and the second accommodating portion through the partition wall, and the heat absorbing member is integrally accommodated over the first accommodating portion, the second accommodating portion, and the connection portion.

10. The battery module of claim 4, wherein the first base includes a fastening protrusion protruding toward the second base, and the second base includes a fastening groove into which the fastening protrusion is inserted.

11. The battery module of claim 1, further comprising:

a sub-barrier disposed to face a second side surface opposite to a first side surface of the first and second battery sub-modules and configured to have a width smaller than that of the barrier.

12. A battery module, comprising:

a first battery sub-module and a second battery sub-module stacked in a first direction, each of the first and second battery sub-modules including a plurality of battery cells and a side plate at least partially contacting at least one of the plurality of battery cells; and a barrier disposed between the side plate of the first battery sub-module and the side plate of the second battery sub-module, wherein the barrier includes:

a rigid member supporting the first battery sub-module and the second battery sub-module; and a heat absorbing member accommodated on a side surface of the rigid member, and configured to face one of the first and second battery sub-modules to absorb heat generated by the one or more battery cells;

wherein the rigid member includes:

a protrusion portion continuously extending along an edge region of the rigid member, protruding toward the first battery sub-module and the second battery sub-module, and pressing against an edge region of the first and second battery sub-modules in the first direction;

a first air gap enclosed by the heat absorbing member and the first battery sub-module and the protrusion portion; and a second air gap enclosed by the heat absorbing member and the second battery sub-module and the protrusion portion.

13. The battery module of claim 12, wherein the side surface of the the rigid member includes an accommodating groove in which the heat absorbing member is accommodated.

14. The battery module of claim 13, wherein the accommodating groove includes a first accommodating groove and a second accommodating groove extending side by side in the same direction, and at least one of the first accommodating groove or the second accommodating groove is configured to have an area corresponding to any one of the battery cells included in the battery sub-modules.

15. The battery module of claim 14, wherein the accommodating groove further includes a connection groove connecting the first accommodating groove and the second accommodating groove, and the heat absorbing member is integrally accommodated over the first accommodating groove, the second accommodating groove, and the connection groove.

16. The battery module of claim 12, wherein the barrier includes a plurality of heat absorbing members, and the plurality of heat absorbing members are accommodated on both side surfaces of the rigid member and are configured to face each of the first and second battery sub-modules.

\* \* \* \* \*